United States Patent
Schwindt et al.

(10) Patent No.: US 10,023,164 B2
(45) Date of Patent: Jul. 17, 2018

(54) VALIDATING AUTOMOTIVE SAFETY FUNCTIONS

(71) Applicant: Robert Bosch GmbH, Stuttgart (DE)

(72) Inventors: Oliver F. Schwindt, Novi, MI (US); Maria Eugenia Garcia Bordes, Gerlingen (DE); Jean-Francois Pelosse, Stuttgart (DE); Moritz Dechant, Ingolstadt (DE)

(73) Assignee: Robert Bosch GmbH, Stuttgart (DE)

(*) Notice: Subject to any disclaimer, the term of this patent is extended or adjusted under 35 U.S.C. 154(b) by 15 days.

(21) Appl. No.: 15/028,733

(22) PCT Filed: Oct. 17, 2014

(86) PCT No.: PCT/US2014/061195
§ 371 (c)(1),
(2) Date: Apr. 12, 2016

(87) PCT Pub. No.: WO2015/058119
PCT Pub. Date: Apr. 23, 2015

(65) Prior Publication Data
US 2016/0264115 A1   Sep. 15, 2016

Related U.S. Application Data

(60) Provisional application No. 62/031,032, filed on Jul. 30, 2014, provisional application No. 61/892,177, filed on Oct. 17, 2013.

(51) Int. Cl.
*B60T 8/88*   (2006.01)

(52) U.S. Cl.
CPC .......... *B60T 8/885* (2013.01); *B60T 2210/36* (2013.01); *B60T 2270/406* (2013.01)

(58) Field of Classification Search
None
See application file for complete search history.

(56) References Cited

U.S. PATENT DOCUMENTS

| | | |
|---|---|---|
| 3,907,380 A | 9/1975 | Fleischer et al. |
| 7,190,260 B2 | 3/2007 | Rast |

(Continued)

FOREIGN PATENT DOCUMENTS

| | | |
|---|---|---|
| DE | 102005022678 | 11/2006 |
| WO | 2009013172 | 1/2009 |

OTHER PUBLICATIONS

International Search Report and Written Opinion for Application No. PCT/US2014/061195 dated Apr. 10, 2015 (9 pages).

(Continued)

*Primary Examiner* — Truc M Do
(74) *Attorney, Agent, or Firm* — Michael Best & Friedrich LLP

(57) ABSTRACT

Methods and systems of validating a vehicle safety function. In one implementation, a plurality of vehicle safety function software programs are developed. A first one of the software programs is installed in a memory of a vehicle controller. The program is run on the controller without delivering at least one vehicle actuator output of the controller generated as a result of running the program. Activation data for the safety function is recorded and the steps of installing, running, and recording with a second one of the plurality of vehicle safety function software programs are repeated.

9 Claims, 2 Drawing Sheets

(56) References Cited

U.S. PATENT DOCUMENTS

| | | | |
|---|---|---|---|
| 7,292,152 B2 | 11/2007 | Torkkola et al. | |
| 7,895,025 B2* | 2/2011 | Boutin | G06F 17/5009 700/29 |
| 2003/0023405 A1* | 1/2003 | Loehr | B60T 8/885 702/182 |
| 2003/0149516 A1* | 8/2003 | Bolzmann | B60G 17/01908 701/30.5 |
| 2004/0162650 A1* | 8/2004 | Kueperkoch | B60G 17/0185 701/29.2 |
| 2004/0181329 A1* | 9/2004 | Tseng | B60G 17/0162 701/38 |
| 2004/0254696 A1* | 12/2004 | Foerstner | B60T 8/885 701/31.7 |
| 2005/0189816 A1* | 9/2005 | Eggert | B60K 31/042 303/9 |
| 2005/0212354 A1* | 9/2005 | Tione | B60T 8/1705 303/20 |
| 2007/0021882 A1* | 1/2007 | Hartrey | G06F 11/0739 701/33.4 |
| 2007/0044551 A1* | 3/2007 | Fogelstrom | B60T 8/885 73/121 |
| 2007/0052289 A1* | 3/2007 | Nilsson | B60T 8/885 303/20 |
| 2007/0192076 A1* | 8/2007 | Boutin | G06F 17/5009 703/13 |
| 2008/0143179 A1* | 6/2008 | Rutherford | B60T 7/20 303/160 |
| 2008/0189039 A1 | 8/2008 | Sadekar et al. | |
| 2009/0273230 A1* | 11/2009 | Wang | B60K 6/48 303/122.09 |
| 2009/0292415 A1* | 11/2009 | Averbeck | B60T 8/32 701/29.1 |
| 2010/0222980 A1* | 9/2010 | Berr | B60T 8/885 701/77 |
| 2012/0303946 A1* | 11/2012 | Braunberger | G06F 9/00 713/100 |
| 2013/0090820 A1* | 4/2013 | Frashure | B60T 8/885 701/70 |
| 2013/0144476 A1* | 6/2013 | Pinto | B60T 8/17555 701/22 |
| 2013/0345913 A1* | 12/2013 | Krueger | B60T 1/10 701/22 |
| 2014/0005883 A1* | 1/2014 | Kidney | G01M 17/007 701/34.4 |
| 2014/0277979 A1* | 9/2014 | Boran | B60T 8/885 701/70 |
| 2015/0105979 A1* | 4/2015 | Hilderband | B60G 17/0165 701/38 |
| 2015/0210258 A1* | 7/2015 | Erdem | B60T 8/885 701/29.2 |
| 2015/0303805 A1* | 10/2015 | Franchini | B60T 8/885 323/271 |
| 2015/0307104 A1* | 10/2015 | Azzi | B60W 10/184 701/33.4 |

OTHER PUBLICATIONS

Miller et al., "An Adaptive Peer-to-Peer Collision Warning System" IEEE 2002, pp. 317-321.

* cited by examiner

VALIDATING AUTOMOTIVE SAFETY FUNCTIONS

BACKGROUND

Embodiments of the invention relate to systems and techniques for validating safety feature on automobiles and similar vehicles.

Modern automobiles, particularly passenger vehicles include number of safety features. Exemplary safety features include anti-lock braking systems ("ABS"), electronic stability control ("ESC"), adaptive cruise control ("ACC"), and the like. Before these safety features are incorporated into vehicles sold to the public, they are tested or validated. These tests often require driving pre-release or pre-series vehicles for extended periods or over a large number of miles. Depending on the functionality, the number of miles can exceed several hundred thousand miles. One automotive safety function or system that requires a high number of validation miles is forward-looking collision mitigation with brake-intervention, especially if the brake-intervention includes full braking of the vehicle. Other examples include collision evasion assistance, and collision mitigation in reverse with full autonomous braking.

SUMMARY

The development and validation of vehicle safety systems and, more particularly, the control functions within such systems, requires that a large amount of data be recorded, so that changes to the control functions are possible after recording the data, and simulations (e.g., computer simulations of vehicle behavior when such functions are activated) give a representative result. Such features and systems are computer-controlled and rely on software and parameters designed and chosen to account for the numerous conditions that can be encountered by a vehicle. Control software may be changed and recording large amounts of data permits later simulations, as if the changed control software was on the vehicle at the time of the data recording. Since the current practice of developing and validating vehicle safety functions includes recording the entire or all data for validation, the data for the actual vehicles with which the functions will be used must be recorded (as opposed to developing it on another vehicle or using data from a generalized or sample vehicle and attempting to apply that data to specific vehicles). However, the current practice has the drawback that representative vehicles must be available at an early stage of the development of the safety function, or that a larger number of vehicles must be available at a later stage of development, so that the data can still be collected. Generally, it takes a long time to drive the large number of miles typically required for validation, and the types of driving scenarios that need to be covered is large, e.g., many different city, highway, and country roads, hills, intersections, and other differences in road and driving infrastructure. In addition, the large amount of data must be stored and sufficient computing power must be available to simulate the data collected with the latest software to validate the functions, in particular to tune the functions so that, among other things, the false activation rate is sufficiently low.

The reason that a large amount of data is recorded is that the false activation rate for the safety functions needs to be below a tolerable risk, that allows the function itself to be rated with an appropriate automotive safety integrity level (ASIL). It is most effective to re-simulate all recorded data to guarantee that the software that goes into production fulfills this aim. A less efficient method would be to drive the distance needed for statistical reliability for every release.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
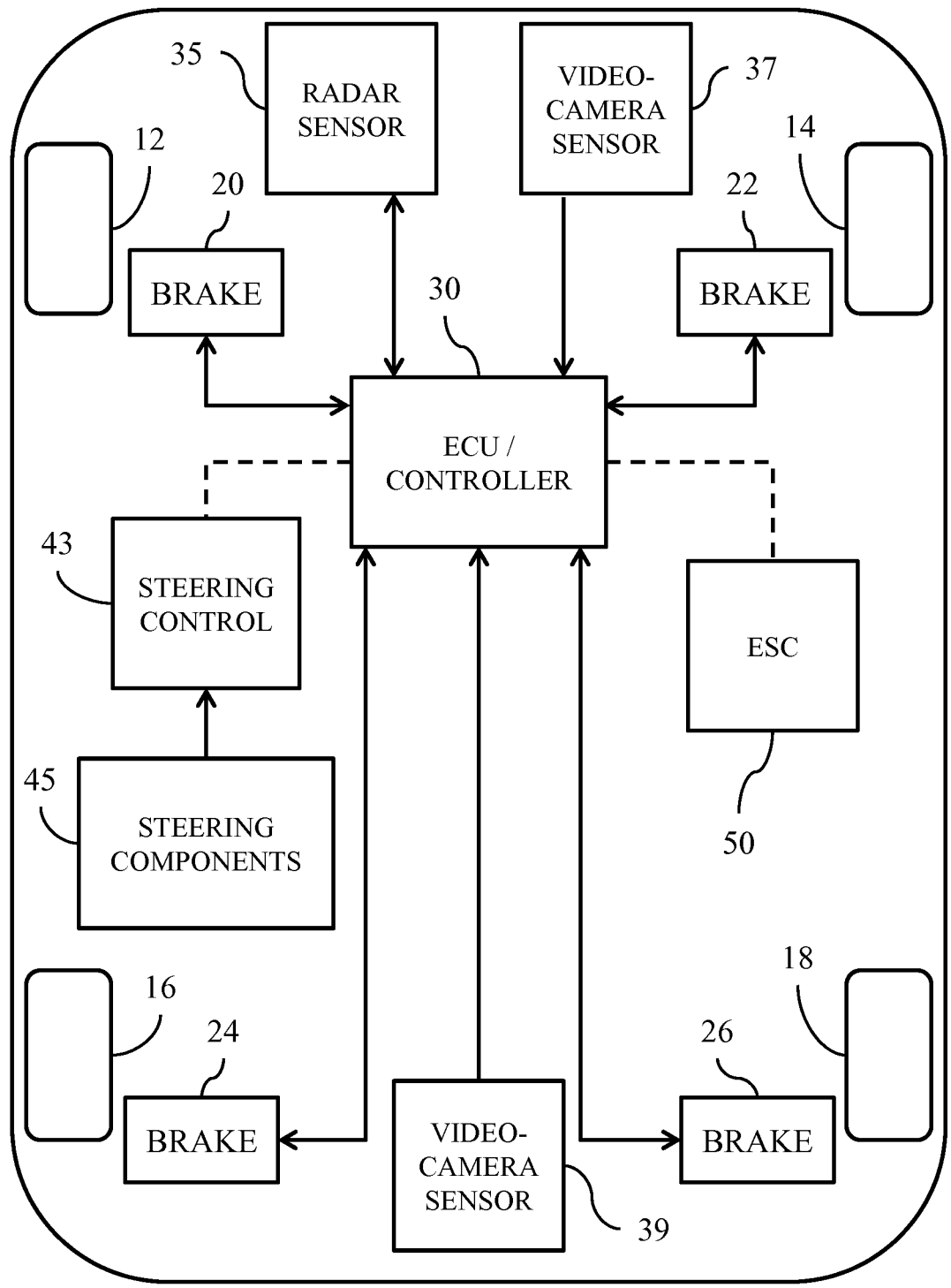
FIG. 1 is a schematic illustration of a vehicle (for example, an automobile) with safety systems and a controller (which may include a processor, memory, and I/O devices).

FIG. 1 illustrates a vehicle 10 that includes four wheels 12, 14, 16, and 18, and corresponding brakes 20, 22, 24, and 26 at each wheel. In the embodiment shown, the brakes communicate with and are controlled by a controller 30. The vehicle controller may take the form, for example, of an electronic control unit (ECU), microprocessor, microcontroller or similar device and include a processor that executes software stored in memory such as ROM and more particularly EEPROM of the controller. Broadly, the brakes are actuators. In other vehicle safety systems, actuators could include components that cause steering wheels to turn and chassis components to operate (for example, a change in spring rate or shock absorber firmness in an active suspension). The brakes could be part of other systems such as an ant-lock braking system and/or an electronic stability control system. In the embodiment shown, the controller 30 controls and is also connected to a radar sensor 35 and a forward facing sensor 37 (such as a camera, ultrasonic sensor, or other sensor or array of sensors) and a rearward-facing sensor 39 (such as a camera, ultrasonic sensor, or other sensor or array of sensors). The radar sensor 35, forward facing sensor 37, brakes, and ESC 50 and/or other components can be part of a forward-collision-mitigation-by-braking system. While a single controller is illustrated, it should be understood that the vehicle 10 could include multiple controllers and that each one of them could configured to control a particular vehicle system or safety function and that each one could execute applicable software to perform such control and communicate with each other. In addition, although the controller 30 is shown in a central location, embodiments of the invention could use controllers positioned locally to the applicable sensors and actuators (for example, the sensors 35, 37, and 39 and brakes 20, 22, 24, and 26) and systems. Connections between the controller 30 and the sensors 35, 37, and 39 and brakes 20, 22, 24, and 26 are shown as direct links. However, the vehicle may be equipped with a bus or network, such as a controller area network ("CAN"), and communication between the controller 30 and other controllers and devices may be accomplished by sending messages over the CAN. For example, the vehicle system may include a steering control 43 that receives data from sensors and devices in a steering system 45.

A significant cost of an automotive safety system or function is determining an optimal or desired benefit-to-false-activation ratio of the automotive safety function. Aspects of the invention include a number of techniques or processes for determining whether an automotive safety function should be activated or not. In certain embodiments, these processes run in parallel, each having a different implementation or parameter tuning. Initially, the data is collected with these processes (for example, software programs, software modules, or software algorithms) running, but without the processes commanding the actuators (e.g., brakes, suspension, or steering components) to react, except possibly the process that reacts latest, which may be active for validation of the actuators. At a later stage of the development project, the process or software program that best fits the benefit (in comparison to the other programs) and false alert requirements is selected, and the vehicle controller or ECU (such as the controller 30) is configured so that the selected software output triggers the actuators.

Unless the context indicates otherwise, as used herein "activation" refers to a software program reporting an activation, and this means that if the software program's output were to be used, then some actuator or component would have been actuated on (e.g., using the vehicle brakes). Only once the desired software program has been selected and programmed to be active, would the actuation actually occur.

In certain aspects of the invention, the different software programs are designed or configured so that the sensitivity of when activations occur differs for each software program. Preferably (but not necessarily), there are a large number of different software programs, and these are developed and implemented by different people. Another method is to have the software program logic fixed, but load different parameters for different sensitivities (which may be an advantage to reduce development costs, but does not provide the same amount of variety and changing the software itself).

Each software program runs on a controller in a vehicle (examples of which were discussed above with respect to FIG. 1), so that the result can be recorded (for example, on a data logger 110 (described below)) and so that neither the processing time nor the flash-file is altered once the final software program has been selected. The number of activations that each software program produces is recorded (in memory) (with additional data about the activation). In certain embodiments, the data relating to the activation is readable using a diagnostic tool, and during development it is preferable that the data be easily accessible such as being made available over a vehicle network such as a CAN. By collecting the activation data, statistics about the benefit-to-false-activation ratio can be derived for each different software program.

Some function activations are a benefit or desired, and others are false activations. Therefore, in certain embodiments a classifier is implemented on the controller so that that the controller can distinguish between the two. One manner of determining false actuations is to count or record the number of actuations that occur at particular GPS coordinates or a neighborhood of coordinates or with a certain predetermined distance as determined using odometer information. So, for example, is a number of identical activations exceeds a threshold, for example 5, in a predetermined area, for example, 25 feet is can be assumed that false activations have occurred. Preferably, the classifier is configured to run as a post-evaluation to assess the driver's reaction to each activation of each software program. In the example of the forward collision mitigation by braking, the benefit case differs from the false activation case, since at least one of the following will occur: (a) the driver will brake strongly, (b) the driver will perform an evasive maneuver, or (c) a collision will occur. In certain embodiments, the thresholds for (a) and (b) are developed to determine whether these maneuvers took place, and this can be done using driving simulators or data from real-world near-accident scenarios. There are some benefit cases where the target vehicle will swerve away, or the driver will mistakenly react to a false activation. It is assumed that these cases are small enough to be statistically negligible. It is also assumed that the classification does not work predictively (like the function itself), but as a post-analysis about how the driver reacted after a software program has triggered an activation. For this reason, it is assumed that the number of undetected sensor or situation analysis errors is extremely small.

The data collected whenever any software program would have activated the function can be, as an example:

a) the software program that caused the activation:

b) the post-evaluation result of whether the driver was braking, evading, collision occurred, or did not react;

c) GPS information or coordinates (if available), to allow the infrastructure to be examined;

d) Odometer value of reaction;

e) Host vehicle state: speed, yaw rate, acceleration over ground, acceleration sensor, etc. Ideally, this should be available from the activation point to several (e.g., 2) seconds after activation in several intervals (e.g., every 200 millisec).

f) Target vehicle state: speed, lateral and longitudinal distances, etc. Preferably, this should be available from the activation point to several (e.g., 2) seconds after activation in several intervals (e.g., every 200 millisec).

g) Driver reaction information: brake pedal and acceleration pedal positions. Preferably, this should be available from the activation point to several (e.g., 2) seconds after activation in several intervals (e.g., every 200 millisec).

h) Any data used in calculating thresholds that are post-determined and written into memory (e.g., EEPROM) of the safety system in the vehicle manufacturing plant (along with selecting the software program). Preferably, every calculation cycle from slightly before the activation to sometime after the activation is stored. This is needed, to help ensure that other calculation cycles would or would not have led to activation when the safety feature is post-tuned.

According to certain aspects of the invention, the diagnostics are set up or configured so that the activation data is written to memory immediately. The reason for this is that there would be a record of activation in the sensor, if, for example, a collision does occur and damages the vehicle such that the data cannot be written a certain time after the event (e.g., power loss to the ECU).

In general, vehicle manufacturers (e.g., OEMs) have vehicles that are series representative about two months before the start of production (SOP). These vehicles are built according to final or near-final specifications and are built according to final or near-final plant processes. There are usually only few minor changes on these vehicles thereafter. The number of vehicles available at this stage is usually on the order of several hundred, and in general these are driven on public roads by a large number of different drivers. In addition, every variant or model of the vehicle is built at this stage. The data from these vehicles is ideal (as compared to data from prototypes or generic vehicles), since a broad range of scenarios is covered by these vehicles, and the data only needs to be collected (and not modified to account for a specific features of production vehicles). In general, the automotive safety functions must be switched off at this stage, so that the function does not influence the data collection, or the most primitive, latest reacting software program should be active.

Some of the vehicles are used on the test track to perform tests for the automotive safety functions, electronic stability control (ESC), or similar testing. Such test-track events may lead to activations, and, in general, are classified as benefit cases. In order to not falsify the number of benefit cases that occur in the real world, a test-track detection could occur by (a) evaluating the GPS coordinates, or (b) if GPS coordinates are not available, if the number of activations is particularly high without driving a large distance, then this can be evaluated to be a high likelihood of being a test track scenario.

Once the data has been collected and evaluated, the software program with the most benefit (in comparison with the other programs), which still meets the false activation target is selected. Since the automotive sensor is likely to be in production at this time, the desired software program should be selectable using diagnostic commands. The diagnostic command telling the sensor which function should be used can be given to each sensor at the plant (e.g., at the same place where the sensor is taken out of plant mode or any other diagnostic takes place). In order to prevent misuse as someone activating different software programs, in certain embodiments the diagnostic command has an activation code that is only given to the assembly plant, for part-replacement in service or other uses when necessary.

It is also possible to configure the software program so that it is able to set threshold parameters at a late stage of safety system development and communicate these via diagnostics (in the final assembly plant) in order to store them into the memory (for example, EEPROM). The number of post-settable options can, therefore, be increased, but this may make the software more complicated. The values of each parameter where the threshold is post-tunable in memory are stored in the data with each function activation. Since the data stored with each function activation may not show every calculation cycle, and may be truncated to save space where this is stored, care is taken to define such thresholds accurately. Since these values must be set in the assembly plant also, this data may be encrypted to prevent manipulation of the data, and in one embodiment a checksum feature is utilized to ensure that the complete set of data has been written to the memory of the sensor.

In one embodiment, as described earlier, nine different programs are developed or determined, for example. One of the nine programs is selected by writing the diagnostic command. As described in the previous paragraph, the thresholds for many parameters can be set, such as in the case of: lateral offset for activation=1.4 m, existence probability threshold 85%, driver steering with less than 20 deg/sec on steering wheel, etc. These thresholds are all individually transmitted to the controller via diagnostic commands and recorded in the sensor to set the parameters of the final program.

Although the techniques and embodiments described herein illustrate how automotive safety functions can be validated without recording the full controller or ECU data, it is still desirable to record a portion of the full controller data for development of any new functions (or changes in any of the software programs), and for validating that the post-analysis and data collected via diagnostics is accurate. Although there are benefit cases in the real world, it is expected that most benefit cases are validated on the test track, and the evaluation is performed for all the different software programs to compare the benefit rates.

Embodiments and aspects of the invention help reduce the number of miles of full data that needs to be collected to validate the automotive safety functions. In addition, aspects and embodiments enable safety functions to be developed on other, even not so similar, vehicles (since the targeted vehicles may not be available at an early stage, especially since there is a trend to reduce development time). Accordingly, reduced costs may be achieved in a number of ways, which may include:

1) Less prototype vehicles are needed to perform the collection of validation miles.

2) Less "full internal controller or ECU data" needs to be collected.

3) Carry-overs from other unrelated vehicles are principally possible. This aspect helps for low-volume vehicles or in projects where representative prototypes are available at a very late stage.

4) More miles of validation than actually necessary may be performed, leading to a more reliable statistics. There is also a better coverage of all types of driving scenarios.

5) In the event that a quality problem is found when the vehicles have already been sold, the tuning of the automotive safety functions can be reconfigured in the dealership immediately, without further development (other than on/off switch, and other than reflashing the memory of the controller or ECU).

6) If a re-validation is required, for example due to a hardware change, software bug, or other part that may influence the sensor of the safety system (e.g., fascia in which an ultrasonic sensor is installed), then this validation can take place quickly and with low costs.

7) In the event that partner controllers or ECUs are changed, or only have a representative part available a short period of time before vehicle SOP, implementations of the invention enable validation to still take place. In particular, since parts are, in general, manufactured six to ten weeks before vehicle SOP, reflashing all of the units produced may be delayed until SOP.

Figure 2:
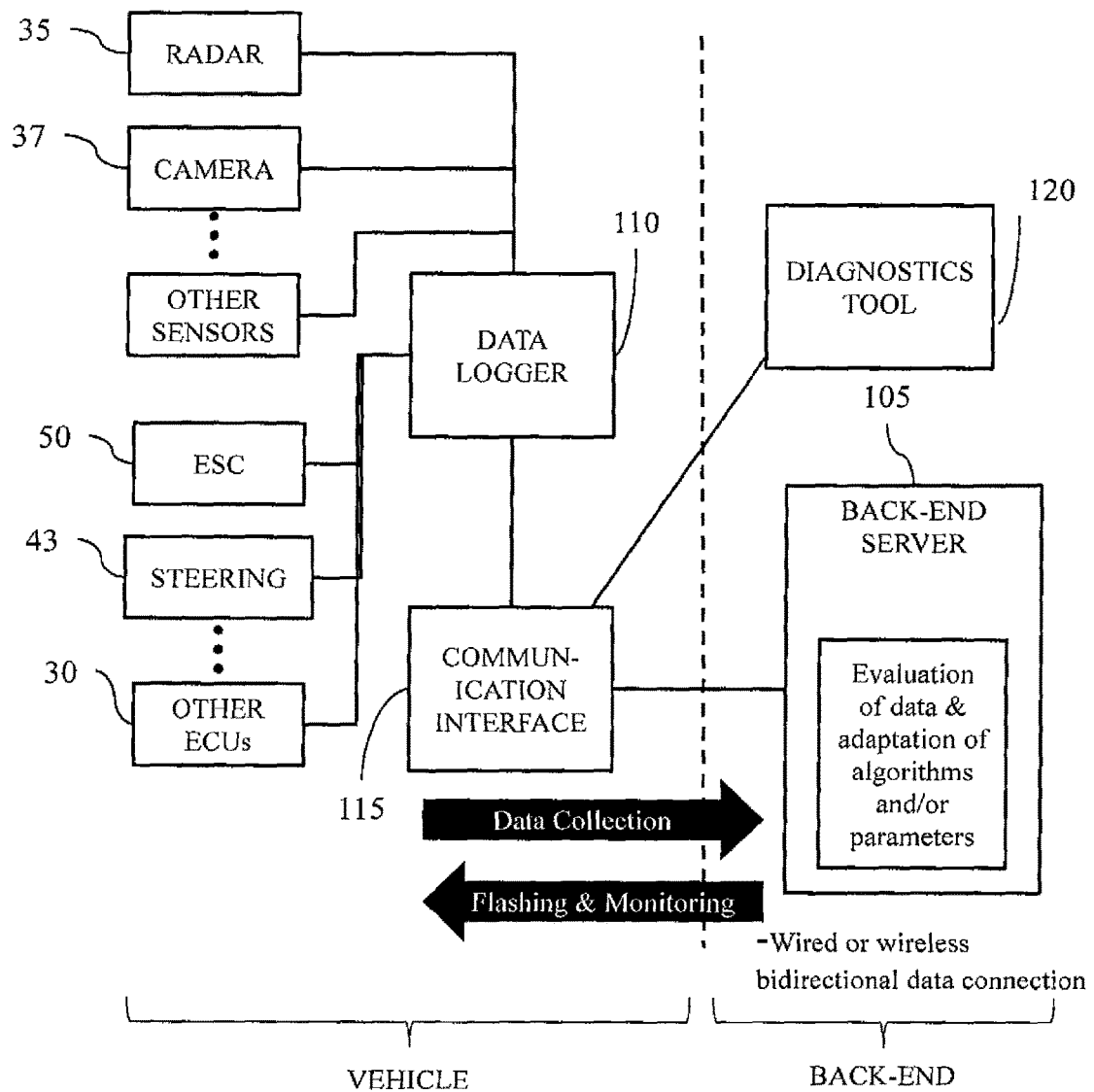
FIG. 2 is a schematic illustration of vehicle systems communicating with a data logger and a connectivity unit or interface, which communicates with a server.

FIG. 2 illustrates a system 100 on and with which aspects of the invention may be implemented. The system 100 includes a computer in the form or a server 105 that communicates with vehicle components such as the sensors 35, 37, and 39, braking and other systems such as electronic stability control 50, steering system control 43, and controller 30. The vehicle components communicate with a data logger 110 connected to, for example, the vehicle CAN. The data logger records data and activation events as discussed above. A connectivity unit or communications interface 11 provides a communication link between the data logger 110 and the server 105. The server 105 stores programs for execution by the controller 30 and/or vehicle systems (for example, electronic stability control 50, forward collision mitigation by braking, etc.), A diagnostics tool 120 may be connected to the communications interface 115 to carry out the diagnostic processes described above, including paragraphs 13, 15, 19, and 20

Additional features and advantages of the invention are set forth in the following claims.

What is claimed is:

1. A method of operating a vehicle safety system of a vehicle having a vehicle controller, and one or more vehicle actuators, the method comprising:

running a plurality of computer-executable, vehicle safety function software programs on the vehicle controller in parallel without delivering at least one vehicle actuator output of the vehicle controller generated in response to an activation of the at least one computer-implemented safety function by one or more of the plurality of computer-executable, vehicle safety function software programs, wherein each computer-executable vehicle safety function software program is configured to generate the activation of the at least one computer-implemented safety function in response to detected conditions based on one or more vehicle sensors;

recording in a data logger activations of each of the plurality of computer-executable vehicle safety function software programs, where the at least one computer-controlled safety function would have activated a vehicle actuator had the at least one vehicle actuator output of the vehicle controller been delivered to the one or more vehicle actuators;

selecting one computer-executable vehicle safety function software program of the plurality of computer-executable vehicle safety function software programs based on the recorded activations in the data logger;

subsequently running the selected computer-executable vehicle safety function software program on the vehicle controller, wherein running the selected computer-executable vehicle safety function software program on the vehicle controller includes
  detecting one or more vehicle conditions based on outputs from one or more vehicle sensors, and
  generating an activation of the at least one computer-implemented safety function in response to detecting the one or more vehicle conditions; and controlling the vehicle safety system in response to a subsequent activation of the at least one computer-implemented safety function by the selected computer-executable vehicle safety function software program by delivering the at least one vehicle actuator output of the vehicle controller to the one or more vehicle actuators.

2. The method of claim 1, wherein each of the plurality of computer-executable, vehicle safety function software programs includes tunable parameters, the method further comprising setting the tunable parameters using a diagnostic command from a diagnostics tool.

3. The method of claim 2, further comprising encrypting the diagnostic commands.

4. The method of claim 1, wherein selecting one computer-executable vehicle safety function software program of the plurality of computer-executable vehicle safety function software programs includes using a diagnostics command to select the computer-executable, vehicle safety function software program for use in a sensor.

5. The method of claim 1, further comprising:
recording in the data logger
  activation data for the activations of each of the plurality of computer-executable, vehicle safety function software programs,
  post-evaluation results for each of the plurality of computer-executable, vehicle safety function software programs,
  vehicle information for the activations of each of the plurality of computer-executable, vehicle safety function software programs, and
  driver reaction information.

6. The method of claim 5, further comprising determining a number of false activations from the recorded activations of the plurality of computer-executable vehicle safety function software programs based at least in part on the activation data.

7. The method of claim 6, wherein GPS-coordinate information, odometer information, or both is used to determine the number of false activations.

8. The method of claim 6, wherein selecting one computer-executable vehicle safety function software program from the plurality of computer-executable, vehicle safety function software programs includes selecting one computer-executable vehicle safety function software program for use in the vehicle safety system based on the number of false activations.

9. The method of claim 1, wherein the one or more vehicle actuators includes one or more brake actuators,
  wherein each vehicle safety function software program of the plurality of vehicle safety function software programs is configured to mitigate a forward-looking collision by causing the one or more brake actuators to apply a braking force in response to detecting conditions indicative of a possible forward-looking collision based on the one or more vehicle sensors, and
  wherein controlling the vehicle safety system in response to the subsequent activation of the at least one computer-implemented safety function by the selected computer-executable vehicle safety function software program by delivering the at least one vehicle actuator output of the vehicle controller to the one or more vehicle actuators includes
    delivering a brake actuation signal from the vehicle controller to the one or more brake actuators in response to detecting, by the selected computer-executable vehicle safety function software program, the condition indicative of the possible forward-looking collision based on the one or more vehicle sensors.

* * * * *